US012260832B2

(12) United States Patent
Noami et al.

(10) Patent No.: US 12,260,832 B2
(45) Date of Patent: Mar. 25, 2025

(54) DISPLAY CONTROL SYSTEM, CIRCUIT DEVICE, AND DISPLAY SYSTEM

(71) Applicant: SEIKO EPSON CORPORATION, Tokyo (JP)

(72) Inventors: Shingo Noami, Hamamatsu (JP); Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/359,256

(22) Filed: Jul. 26, 2023

(65) Prior Publication Data

US 2024/0038181 A1 Feb. 1, 2024

(30) Foreign Application Priority Data

Jul. 27, 2022 (JP) ................................ 2022-119711

(51) Int. Cl.
*G09G 3/34* (2006.01)
*G09G 3/36* (2006.01)

(52) U.S. Cl.
CPC ............ *G09G 3/3413* (2013.01); *G09G 3/36* (2013.01); *G09G 2320/0242* (2013.01); *G09G 2320/0626* (2013.01); *G09G 2360/16* (2013.01)

(58) Field of Classification Search
CPC ...... G09G 3/3413; G09G 3/36; G09G 3/3426; G09G 3/342; G09G 3/3406; G09G 2320/0242; G09G 2320/0626; G09G 2320/0238; G09G 2330/021; G09G 2360/16; G09G 2360/144; G09G 2380/10
See application file for complete search history.

(56) References Cited

U.S. PATENT DOCUMENTS

2010/0085374 A1* 4/2010 Lee ...................... G09G 3/3426 345/589
2011/0122168 A1 5/2011 Lee et al.
2011/0141166 A1* 6/2011 Ahn ..................... G09G 3/3426 345/691
2020/0135074 A1* 4/2020 Wooster ................. G09G 3/006
2020/0320941 A1* 10/2020 Ge ....................... G09G 3/3607
2023/0209687 A1 6/2023 Tamano

FOREIGN PATENT DOCUMENTS

JP 2020-112668 A 7/2020
WO 2020/025648 A1 2/2020
WO 2021-241066 A1 12/2021

* cited by examiner

*Primary Examiner* — David Tung
(74) *Attorney, Agent, or Firm* — Harness, Dickey & Pierce, P.L.C.

(57) ABSTRACT

A display control system according to an embodiment includes: a processing device configured to calculate global dimming information for global dimming control on a backlight of a display device, and perform color correction on image data based on the global dimming information; and a circuit device configured to perform display control on the display device based on the image data from the processing device. The circuit device includes a dimming control circuit that calculates, based on the image data and the global dimming information from the processing device, local dimming information for local dimming control on the backlight, and a light source control circuit that performs light source control on the backlight based on the local dimming information from the dimming control circuit.

9 Claims, 9 Drawing Sheets

DISPLAY CONTROL SYSTEM, CIRCUIT DEVICE, AND DISPLAY SYSTEM

The present application is based on, and claims priority from JP Application Serial Number 2022-119711, filed Jul. 27, 2022, the disclosure of which is hereby incorporated by reference herein in its entirety.

BACKGROUND

1. Technical Field

The present disclosure relates to a display control system, a circuit device, a display system, and the like.

2. Related Art

In a display device, global dimming control is performed based on detection information or the like from an external light sensor. WO2021/241066 discloses a display device in which local dimming control, which is dimming control for each light source of a plurality of light sources, is performed.

However, a display control system that implements both global dimming control and local dimming control without greatly changing an existing system is not proposed until now.

SUMMARY

An aspect of the present disclosure relates to a display control system including: a processing device configured to calculate global dimming information for global dimming control on a backlight of a display device including a display panel and the backlight, and perform color correction on image data based on the global dimming information; and a circuit device configured to perform display control on the display device based on the image data from the processing device. The circuit device includes a dimming control circuit that calculates, based on the image data from the processing device and the global dimming information, local dimming information for local dimming control of the backlight, and a light source control circuit that performs light source control on the backlight based on the local dimming information from the dimming control circuit.

Another aspect of the present disclosure relates to a circuit device including: an interface circuit configured to receive global dimming information from a processing device that calculates the global dimming information for global dimming control of a display device provided with a display panel and a backlight and performs color correction on image data based on the global dimming information; a dimming control circuit that calculates, based on the image data from the processing device and the global dimming information, local dimming information for local dimming control of the backlight; and a light source control circuit that performs light source control on the backlight based on the local dimming information from the dimming control circuit.

Another aspect of the present disclosure relates to a display system including: the display control system described above; and the display device described above.

DESCRIPTION OF EMBODIMENTS

Hereinafter, a preferred embodiment according to the present disclosure will be described in detail. The embodiment to be described below does not unduly limit contents described in the claims, and not all configurations described in the embodiment are necessarily essential constituent elements.

1. Display Control System and Circuit Device

Figure 1:
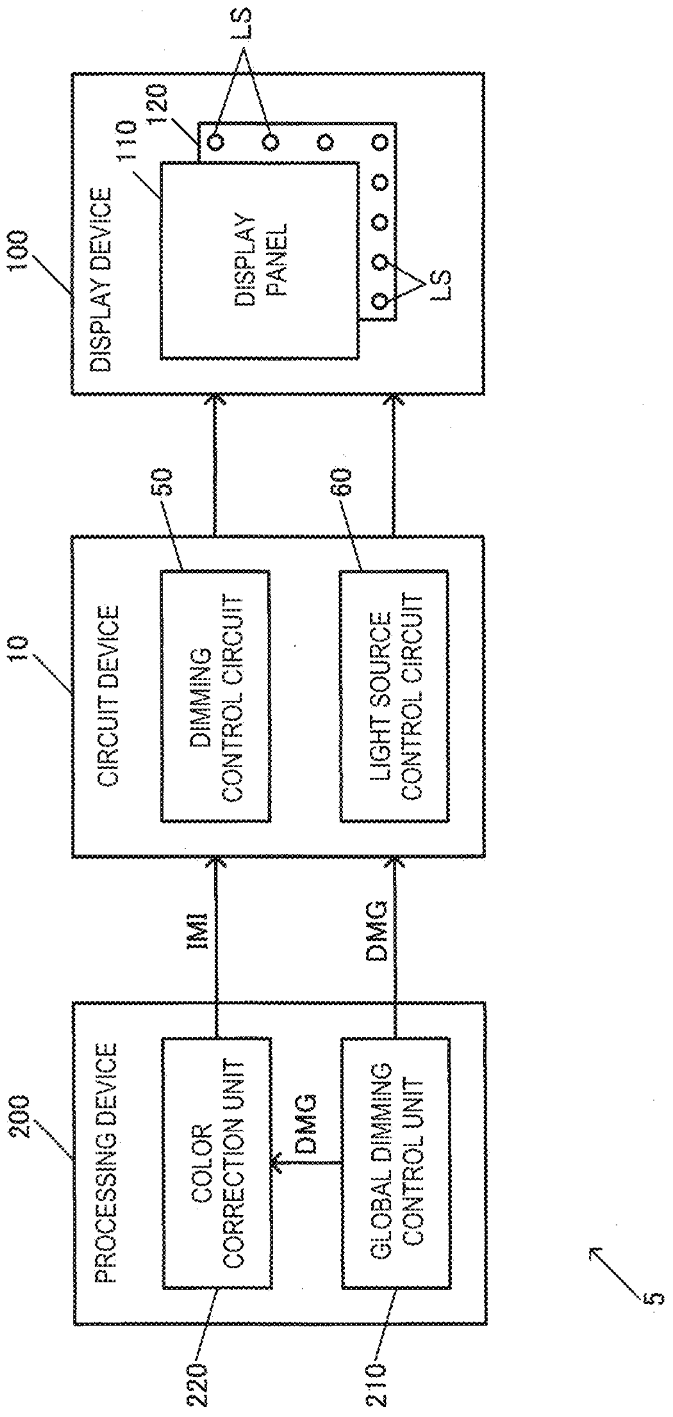
FIG. 1 shows a configuration example of a display control system and a circuit device according to an embodiment.

FIG. 1 shows a configuration example of a display control system 5 and a circuit device 10 according to an embodiment. The display control system 5 includes a processing device 200 and the circuit device 10. The circuit device 10 includes a dimming control circuit 50 and a light source control circuit 60. The display control system 5 is a system that performs display control on a display device 100.

The display device 100 displays an image based on image data. When a head-up display is taken as an example, the display device 100 is a device for displaying a virtual image in a field of view of a user. In addition, the display device 100 is, for example, a display device used for the head-up display, and may be another display device for an automobile, such as a cluster display which is a meter panel display, or may be a display device for an application other than the automobile. In the following description, the head-up display is appropriately referred to as a HUD.

The display device 100 includes a display panel 110 and a backlight 120. The display panel 110 is, for example, an electro-optical panel. The display device 100 may include a light source driver (not shown) for driving a light source of the backlight 120, a display controller (not shown), and a display driver (not shown) for driving the display panel 110. For example, the backlight 120 is provided with a plurality of light sources LS. Specifically, the plurality of light sources LS each being implemented by an LED or the like are arranged in arrays in the backlight 120. The light source driver drives the plurality of light sources LS to emit light. The display driver may include a data driver that drives data lines of the display panel 110, a scanning driver that drives scanning lines of the display panel 110, and the like.

The processing device 200 is, for example, a system on chip (SoC) and is also called, for example, a master device. The processing device 200 can be implemented by, for example, a microcomputer, a CPU, or a MPU. For example, the circuit device 10 is communicably connected to the processing device 200 through an interface circuit (not shown). Further, image data IMI from the processing device 200 is input to the circuit device 10 through the interface circuit.

The circuit device 10 is, for example, an integrated circuit device in which a plurality of circuit elements are integrated on a semiconductor substrate. The display device 100 displays the image based on display image data from the circuit device 10. When the display device 100 is the HUD, the circuit device 10 is a HUD controller.

The processing device 200 calculates global dimming information for global dimming control of the backlight 120 of the display device 100. The processing device 200 performs color correction on the image data based on the global dimming information. The calculation of the global dimming information is performed by a global dimming control unit 210. The color correction of the image data is performed by a color correction unit 220. The global dimming control unit 210 and the color correction unit 220 can be implemented by, for example, a processor implementing the processing device 200 or a program operating on a processor.

For example, the processing device 200 performs processing of the global dimming control on the backlight 120 based on detection information from an external light sensor or the like. For example, the processing of the global dimming control is performed such that light from the light sources LS of the backlight 120 is brightened when external light is bright, and light from the light sources LS of the backlight 120 is darkened when the external light is dark. The processing device 200 calculates global dimming information DMG for such global dimming control. The global dimming information DMG is information on a dimming amount of the backlight 120 based on global dimming. For example, the global dimming information DMG is luminance correction information of the backlight 120 when performing correction to brighten or darken luminance of the backlight 120 by the global dimming. The processing device 200 outputs the calculated global dimming information DMG to the circuit device 10.

The processing device 200 performs the color correction on the image data and outputs the image data IMI after the color correction. For example, the processing device 200 performs the color correction based on the global dimming information DMG calculated by the global dimming, and outputs the image data IMI after the color correction to the circuit device 10. For example, when the luminance of the backlight 120 changes due to the global dimming, a color tone of a display image on the display device 100 changes. For example, due to factors such as a color of the light source of the backlight 120, the color tone of the display image also changes according to the change in the luminance of the backlight 120. The processing device 200 performs the color correction for preventing the change in the color tone of the display image according to the change in the luminance of the backlight 120, and outputs the image data IMI after the color correction.

The dimming control circuit 50 of the circuit device 10 calculates, based on the image data IMI and the global dimming information DMG from the processing device 200, local dimming information for local dimming control on the backlight 120. For example, the dimming control circuit 50 receives the global dimming information DMG and the image data IMI on which the color correction is performed based on the global dimming information DMG from the processing device 200, and calculates the local dimming information based on the image data IMI and the global dimming information DMG. The local dimming information is information on the dimming amount of the backlight 120 based on local dimming. For example, when the backlight 120 includes a plurality of light sources and each light source of the plurality of light sources is provided corresponding to a respective one of a plurality of areas of the display panel 110, the local dimming information is information on the dimming amount of each light source of the backlight 120 set in a corresponding area of the plurality of areas. For example, the dimming control circuit 50 calculates the information on the dimming amount of each light source of the backlight 120 in the corresponding area based on an analysis result of the image data IMI in the area of the plurality of areas and the luminance correction information which is the global dimming information DMG.

The light source control circuit 60 of the circuit device 10 performs light source control on the backlight 120 based on the local dimming information from the dimming control circuit 50. For example, the light source control circuit 60 performs the light source control for causing the light source LS of the backlight 120 to emit light with the dimming amount set in the local dimming information. For example, when the light source driver of the backlight 120 is provided in the display device 100, the light source control circuit 60 implements the light source control on the backlight 120 by outputting, to the light source driver, luminance information for each area which is the local dimming information and a control signal of the light source driver. When generating a PWM signal for the light source LS of the backlight 120, the light source control circuit 60 may implement the light source control on the backlight 120 by outputting the PWM signal.

The circuit device 10 outputs the display image data of the display device 100 to the display device 100. The display image data is image data obtained by performing the color correction based on the local dimming information on the image data IMI on which the color correction based on the global luminance information is performed. The dimming control circuit 50 and the light source control circuit 60 are, for example, logic circuits. These logic circuits may be implemented as separate circuits, or may be implemented as an integrated circuit by automatic placement and wiring, or the like. Alternatively, a part or all of these logic circuits may be implemented by a processor such as a digital signal processor (DSP). In this case, a program or a command set in which a function of each circuit is described is stored in a memory, and the function of each circuit is implemented by a processor executing the program or the command set.

As described above, in the embodiment, the processing device 200 calculates the global dimming information for performing the global dimming control. The processing device 200 performs the color correction on the image data based on the global dimming information. Further, the dimming control circuit 50 of the circuit device 10 calculates, based on the image data and the global dimming information from the processing device 200, the local dimming information for performing the local dimming control, and the light source control circuit 60 performs the light source control on the backlight 120 based on the local dimming information. In this way, it is possible to implement the display control system 5 in which the processing device 200 performs the global dimming control and the circuit device 10 performs the local dimming control reflecting the global dimming control. Therefore, even if an existing system in which the processing device 200 performs the global dimming control is not changed, the dimming control in which the local dimming control considering the global dimming control is implemented can be performed, and more appropriate dimming control on the display device 100 can be implemented.

For example, the display control system 5 according to the embodiment includes the processing device 200 that performs the global dimming control and outputs an image to the circuit device 10, and the circuit device 10 that performs the local dimming control on the received image. The circuit device 10, which is a HUD controller or the like, performs the dimming control for each area of the plurality of areas using the image and the luminance correction information received from the processing device 200, which is a master device, as parameters, thereby enabling high-contrast image display while performing cooperative control with the global dimming control of the master device without significantly changing the existing system.

For example, until now, the master device receives brightness of external light via a sensor, and outputs a signal to the light source driver for controlling the luminance of the backlight to improve visibility of a display. In the local dimming, it is possible to output a high-contrast image by dividing the backlight into areas and performing the dimming control in each area. Until now, the HUD controller is not able to perform control in which the global dimming control and the local dimming of the master device are combined.

For example, when only the global dimming control is performed, since single luminance control is performed on an entire screen, leakage light of the backlight along a display shape is visually recognized in a low-illuminance environment. Accordingly, visibility of an image displayed on the HUD and visibility in front of the driver deteriorate. In a HUD display control system in the related art, the luminance information for performing the global dimming control is input from the master device to the light source driver. Therefore, in order to transmit a control signal for reflecting the luminance information for each area to each light source driver, it is necessary to signal-process the luminance information from the master device and convert the luminance information into a signal for performing the local dimming.

In this regard, in the embodiment, using the image after the global dimming and the luminance correction information from the master device which is the processing device 200 as parameters, the local dimming control is performed in the HUD controller which is the circuit device 10, and the luminance information and a driver control signal are transmitted to each light source driver. In this way, by performing backlight control for each area, it is possible to display an image with clear brightness on a projection target, and it is possible to prevent the leakage light in the low-illuminance environment. In addition, when there is an image having a locally dark portion, it is possible to reduce the luminance of the backlight only for that area, which leads to a reduction in power consumption. By simply incorporating the HUD controller between the master device, the display, and the light source driver, the local dimming control in cooperation with the global dimming control of the master device can be implemented. Therefore, it is possible to perform functional extension without requiring a large change in the system.

2. Detailed Configuration Example

Figure 2:
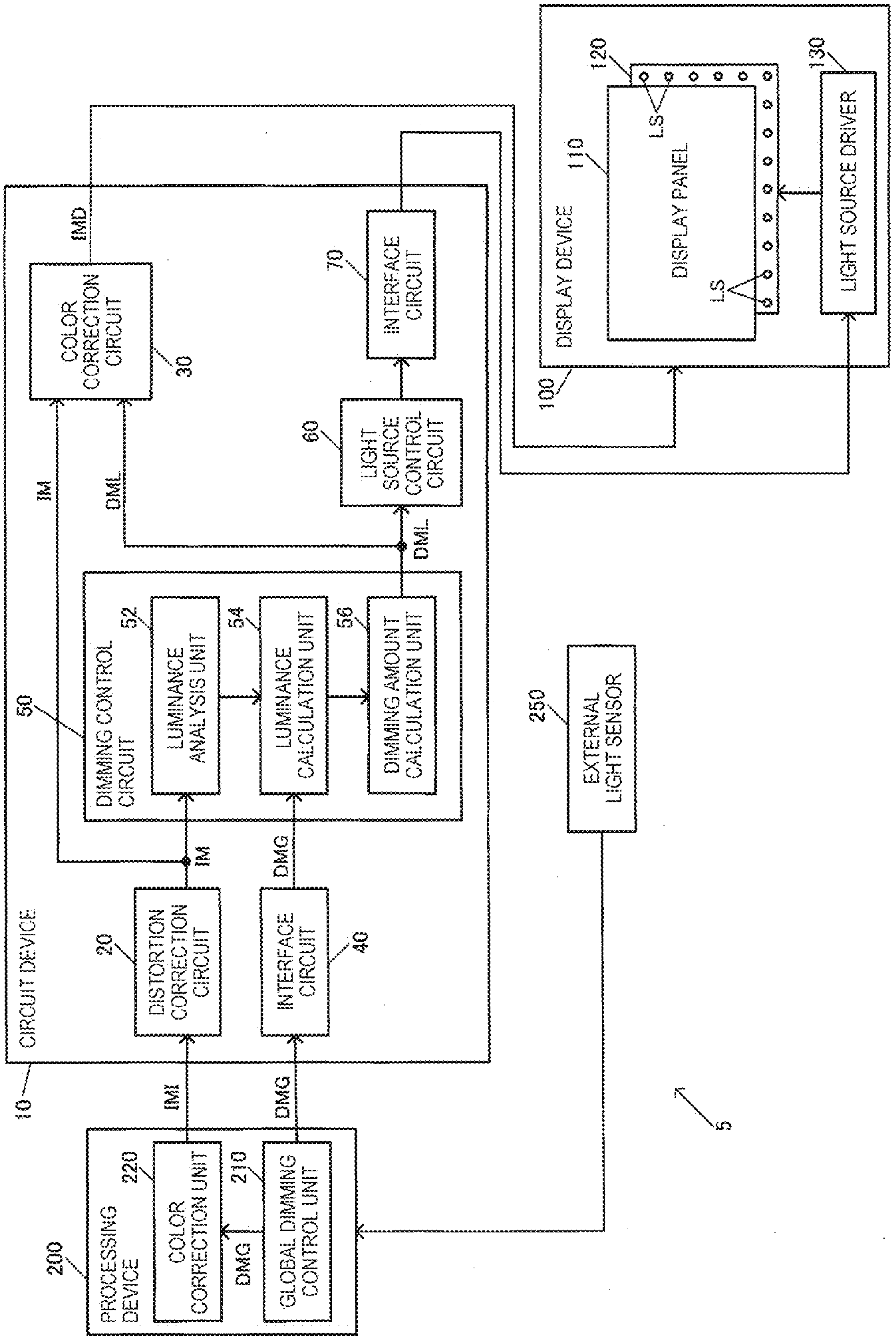
FIG. 2 shows a detailed configuration example of the display control system and the circuit device according to the embodiment.

FIG. 2 shows a detailed configuration example of the display control system 5 and the circuit device 10 according to the embodiment. In FIG. 2, the circuit device 10 includes a distortion correction circuit 20, a color correction circuit 30, and interface circuits 40 and 70 in addition to the configuration of FIG. 1. The circuit device 10, the processing device 200, and the display device 100 are not limited to the configuration example in FIG. 2 or the configuration of another configuration example to be described later, and various modifications such as omitting a part of the components, adding other components, and replacing a part of the components with other components can be made.

The processing device 200 includes the global dimming control unit 210 and the color correction unit 220. The global dimming control unit 210 performs control processing for the global dimming, and the color correction unit 220 performs color tone correction on an image. Specifically, the global dimming control unit 210 calculates, based on detection information from an external light sensor 250, the global dimming information DMG for the global dimming control on the backlight 120 of the display device 100, and outputs the calculated global dimming information DMG to the circuit device 10. For example, when it is determined that external light detected by the external light sensor 250 is bright, the global dimming control unit 210 performs dimming processing of making the luminance of the backlight 120 bright. When it is determined that the external light is dark, the global dimming control unit 210 performs the dimming processing of making the luminance of the backlight 120 dark. The color correction unit 220 performs the color correction on the image data based on the calculated global dimming information DMG, and outputs the image data IMI subjected to the color correction to the circuit device 10. For example, when the global dimming control unit 210 performs luminance correction for brightening or darkening the backlight 120, the color correction unit 220 performs the color correction for preventing a change in the color tone of the display image caused by the luminance correction of the backlight 120. The global dimming information DMG and the image data IMI are output to the circuit device 10 through, for example, an interface circuit (not shown).

The display device 100 includes a display panel 110, a backlight 120, and a light source driver 130. A plurality of light source drivers, with each light source driver being provided for each light source group of the backlight 120, may be provided. The display device 100 may include a display driver (not shown) that drives the display panel 110.

Figure 3:
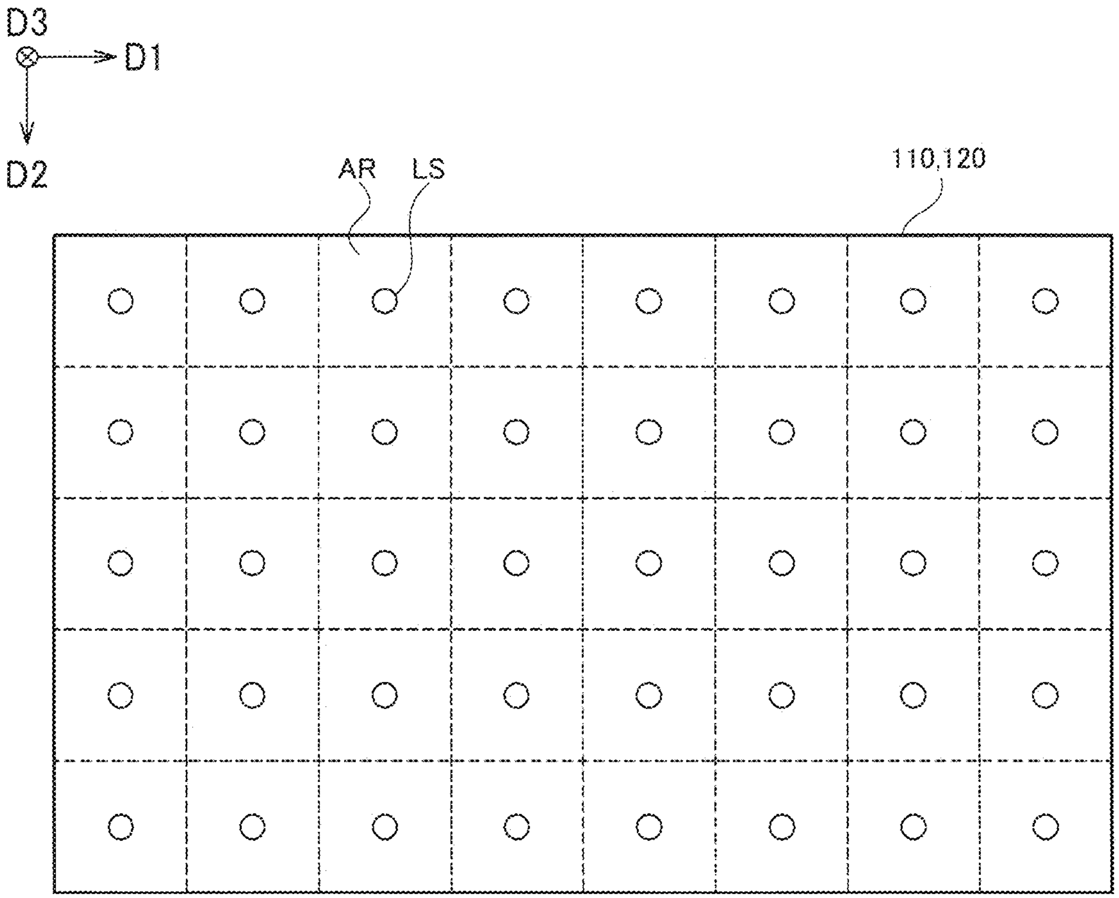
FIG. 3 shows a configuration example of a backlight and a display panel.

FIG. 3 is a configuration example of the backlight 120 and the display panel 110. In FIG. 3, a direction D1 is a horizontal scanning direction of the display panel 110, and a direction D2 is a vertical scanning direction of the display panel 110. A direction D3 is a direction orthogonal to the directions D1 and D2, and is a direction in which the display panel 110 is viewed in a plan view. The backlight 120 is provided on a direction D3 side of the display panel 110, and emits illumination light in a direction opposite to the direction D3, which is a direction toward the display panel 110.

The backlight 120 includes the plurality of light sources LS. FIG. 3 shows an example in which 8×5 light sources LS are arranged in a two-dimensional array. That is, eight light sources LS are arranged along the direction D1, and five light sources LS are arranged along the direction D2. For appropriate local dimming, it is desirable to provide, for example, 100 or more light sources LS in the backlight 120. The light source LS is, for example, a light emitting diode (LED). The light source LS is not limited to the LED, and may be a light source whose light amount is independently controlled and which is close to a point light source. The light source close to the point light source is a light source in which a size of a light emitting portion of the light source LS is sufficiently smaller than an area AR corresponding to the light source LS. As the arrangement of the light sources LS, various arrangement forms such as a square arrangement and a hexagonal arrangement may be considered.

The display panel 110 has a pixel array, and an area in which a display image is displayed in the pixel array is set as a display area. The display area is divided into a plurality of areas AR. The light sources LS are disposed in the areas AR such that the light sources LS correspond to the areas AR, respectively. That is, one light source LS corresponds to one area AR. For example, when the display panel 110 is viewed in a plan view, the light source LS is disposed at a center of the area AR. However, an arrangement position of the light source LS is not limited thereto. In FIG. 3, the display area is divided into 8×5 areas AR corresponding to the 8×5 light sources LS. The areas AR are used for processing in the circuit device 10. In the display image actually displayed on display panel 110, boundaries of the areas AR do not exist. The display panel 110 is a panel in which a transmittance of pixels is controlled according to the display image, and the illumination light of the backlight 120 transmits through the pixels to display the display image. The display panel 110 is, for example, a liquid crystal display panel.

Figure 4:
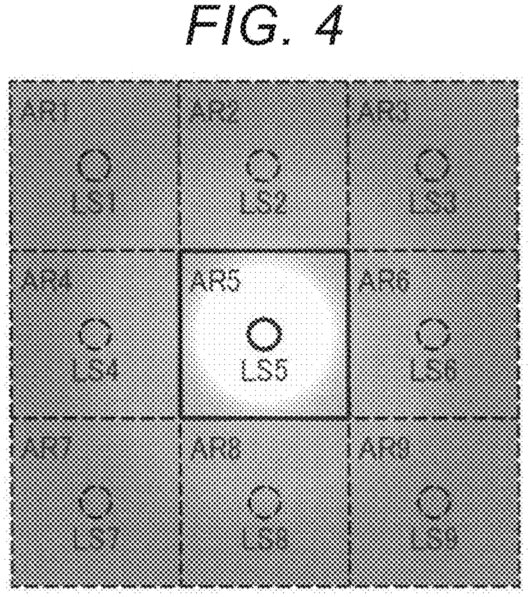
FIG. 4 is a diagram illustrating light sources and display areas.

As described above, when the display area of the display panel 110 is divided into the plurality of areas such that the light sources LS are disposed in the respective areas AR, the light sources LS illuminating the display panel 110 each have a light intensity distribution in which a light intensity decreases as a distance from the corresponding light source LS increases. Therefore, the light intensity in a peripheral portion is smaller than that in the center of the area AR. The light intensity distribution of the light source LS is referred to as PSF. FIG. 4 shows an example of the light intensity distribution of the PSF. In FIG. 4, the light intensity distribution is indicated by gradation, and as the light intensity is indicated whiter, a coefficient of the light intensity distribution is larger. In FIG. 4, a size of the PSF corresponds to 3×3 areas AR1 to AR9, and a center of the PSF is disposed at the position of the light source.

As shown in FIG. 2, the circuit device 10 includes the distortion correction circuit 20 and the color correction circuit 30. The distortion correction circuit 20 performs distortion correction on the image data IMI which is input image data from the processing device 200, and outputs image data IM after the distortion correction. Then, the color correction circuit 30 performs the color correction on the image data IM from the distortion correction circuit 20.

Specifically, the distortion correction circuit 20 performs the distortion correction on the input image data IMI by using coordinate conversion between pixel coordinates in the input image data IMI and pixel coordinates in the image data IM, and outputs a result as the image data IM. The distortion correction is image correction for performing a HUD display with no or reduced distortion by applying, to an image, image distortion inverse to image distortion when the image displayed on the display panel 110 is projected. The image distortion caused by projection includes image distortion caused by a curved surface of a screen of the HUD, image distortion caused by a HUD optical system, and both of the two kinds of image distortion. For example, the HUD presents an image to the user by projecting the image on a transparent screen or displaying the image on a transparent display panel. At this time, by deforming the image according to curvature or the like of the transparent screen or the transparent display panel, the user can see the image without distortion. The distortion correction circuit 20 performs such image deformation processing as the distortion correction.

For example, the distortion correction circuit 20 performs processing of reverse mapping or forward mapping. The reverse mapping is also called a reverse warp, and is mapping processing in which the pixel coordinates in the image data IM, which is output image data, are coordinate-converted into reference coordinates corresponding to the pixel coordinates, and pixel data of the image data IM is obtained from pixel data of the image data IMI at the reference coordinates. The forward mapping is also called a forward warp, and is mapping processing in which the pixel coordinates in the image data IMI are coordinate-converted into movement destination coordinates corresponding to the pixel coordinates, and pixel data of the image data IM at the movement destination coordinates is obtained from pixel data of the image data IMI at the pixel coordinates. The coordinate conversion in the reverse mapping and the forward mapping is defined by a mapping parameter also called map data. The mapping parameter is a table in which coordinates on an input image are associated with coordinates on an output image, a table indicating a movement amount between the coordinates on the input image and the coordinates on the output image, a coefficient of a polynomial in which the coordinates on the input image are associated with the coordinates on the output image, or the like.

The color correction circuit 30 performs the color correction on the image data IM and outputs display image data IMD to the display device 100. That is, the color correction circuit 30 performs the color correction on the image data IM and outputs the image data IM after the color correction to the display device 100 as the display image data IMD. The color correction is, for example, color adjustment processing of the image data IM, and is correction processing of adjusting a color level. The color correction may also be referred to as luminance correction or gradation correction of the image data IM.

For example, when dimming control is performed while the display image data IMD is being displayed on the display device 100, the color correction circuit 30 performs the color correction on the image data IM according to a dimming amount under the dimming control. The dimming control is control for adjusting a light amount of the light source device such as the backlight. The dimming control is dimming control such as local dimming under which brightness of a light source device such as the backlight is controlled for each area of the plurality of areas, and dimming control under which brightness of an entire display screen is globally controlled. Under the dimming control, in order to reduce power consumption of the light source device and to make black pixels appear blacker, control is performed to decrease a light amount of the light source of the light source device. In this case, the color correction circuit 30 performs the color correction to increase luminance of pixels corresponding to the light source on the display screen of the display device 100 by an amount corresponding to the decrease in the light amount of the light source. For example, the color correction circuit 30 performs the color correction on each pixel value of the image data IM, so that the image displayed on the display device 100 based on the display image data IMD has brightness and hue the same as an image of the image data IM, and outputs the image data IM after the color correction to the display device 100 as the display image data IMD. The color correction performed by the color correction circuit 30 is not limited to such color correction for compensating for the dimming control, and may be color correction for adjusting the hue of the display image on the display device 100.

The interface circuit 40 is a circuit that performs interface processing with the processing device 200, and is, for example, a host interface circuit. For example, the global dimming information DMG calculated in the processing device 200 is received from the processing device 200 through the interface circuit 40. The luminance correction information that is the received global dimming information DMG is stored in a register (not shown).

The interface circuit 70 is a circuit that performs interface processing with the display device 100. For example, the luminance information which is local dimming information DML for each area of the plurality of areas is output to the light source driver 130 of the display device 100 through the interface circuit 70. The interface circuit 70 also outputs a control signal for the light source driver 130.

A processing device such as a MCU may be provided between the light source control circuit 60 and the light source driver 130 to absorb a difference in communication protocol depending on a model of the light source driver 130. In this case, the light source driver 130 is controlled by the light source control circuit 60 through the processing device such as the MCU. The interface circuits 40 and 70 may be implemented by one interface circuit. The distortion correction circuit 20, the color correction circuit 30, the dimming control circuit 50, the light source control circuit 60, and the interface circuits 40 and 70 are logic circuits. These logic circuits may be implemented as separate circuits, or may be implemented as an integrated circuit by automatic placement and wiring, or the like. Alternatively, a part or all of these logic circuits may be implemented by a processor such as a DSP. In this case, a program or a command set in which a function of each circuit is described is stored in a memory, and the function of each circuit is implemented by a processor executing the program or the command set.

The dimming control circuit 50 performs the dimming control on the light source based on the image data IM. Specifically, the dimming control circuit 50 performs the dimming control on the backlight 120 provided with the plurality of light sources, and implements the dimming control called, for example, the local dimming. For example, the dimming control circuit 50 performs calculation processing for obtaining information on the dimming amount based on the image data IM. Here, the information on the dimming amount is information for identifying the luminance at which the light source emits light under the dimming control. The light source control circuit 60 performs, based on the information on the dimming amount from the dimming control circuit 50, control processing and designation processing on the light source driver 130 of the display device 100. The light source driver 130, which is a LED driver, drives the light sources LS of the backlight 120 based on the information on the dimming amount, thereby implementing the dimming control on the backlight 120. For example, the local dimming is implemented in which the dimming control is performed for each area of the plurality of areas obtained by dividing the display area of the display panel 110.

In the embodiment, the dimming control circuit 50 performs luminance analysis on the image data IM and calculates the local dimming information DML based on a result of the luminance analysis and the global dimming information DMG.

In this way, the local dimming control can be implemented by calculating the local dimming information DML according to the result of the luminance analysis on the image data IM and performing the dimming on the backlight 120 with the dimming amount corresponding to the local dimming information DML. In the embodiment, the local dimming information DML is calculated based on, in addition to the result of the luminance analysis on the image data IM, the global dimming information DMG from the processing device 200 that performs the global dimming control. Accordingly, the dimming control of the backlight 120 reflecting the global dimming control performed by the processing device 200 can be performed with respect to the local dimming control performed in the circuit device 10. As a result, even if an existing system in which the processing device 200 performs the global dimming control is not changed, the local dimming control can be performed in addition to the global dimming control, and more appropriate dimming control on the display device 100 can be implemented.

Specifically, in the embodiment, as described with reference to FIGS. 3 and 4, the backlight 120 includes the plurality of light sources LS, and each of the plurality of light sources LS is provided corresponding to a respective one of the plurality of areas AR of the display panel 110. Then, the dimming control circuit 50 performs the luminance analysis on the image data IM in each of the areas, and calculates, based on a result of the luminance analysis in the area and the global dimming information DMG, the dimming amount of the light source corresponding to the area as the local dimming information DML.

In this way, the luminance, which is the dimming amount of the light source LS corresponding to each area of the plurality of areas AR of the display panel 110, can be controlled based on the result of luminance analysis on the image data IM in each area, and the local dimming control can be implemented. In the embodiment, the local dimming information DML is calculated based on, in addition to the result of the luminance analysis on the image data IM in each area, the global dimming information DMG from the processing device 200 that performs the global dimming control. Accordingly, the dimming control on the backlight 120 reflecting the global dimming control performed by the processing device 200 can be performed with respect to the local dimming control performed in the circuit device 10, and more appropriate dimming control on the display device 100 can be implemented.

As shown in FIG. 2, the circuit device 10 includes the color correction circuit 30 that performs the color correction on the image data IM based on the image data IM and the local dimming information DML. For example, the color correction circuit 30 performs the color correction according to the dimming control on the backlight 120 based on the information on the dimming amount which is the local dimming information DML from the dimming control circuit 50. For example, when the dimming control for decreasing the light amount of the light source is performed in the area corresponding to the light source, the color correction circuit 30 performs the color correction to increase the luminance of the pixels in the area by an amount corresponding to the decrease in the light amount of the light source in the area, and outputs the display image data IMD after the color correction to the display device 100. Accordingly, the light amount of the light source in the area can be decreased, and the image corresponding to the original image data IM can be displayed in the area based on the display image data IMD obtained by the color correction, so that the local dimming can be implemented. As a result, it is possible to reduce the power consumption of the backlight 120 and to display an image in which black pixels appear blacker.

The circuit device 10 includes the distortion correction circuit 20 that performs the distortion correction on the image data IMI from the processing device 200. The color correction circuit 30 performs the color correction based on the image data IM on which the distortion correction is performed and the local dimming information DML.

By providing such a distortion correction circuit 20, it is possible to perform, on the image, the distortion correction, which is the image distortion inverse to the image distortion caused by the curved surface or the like of the screen on which the display image of the display panel 110 is projected. Accordingly, the user can see the image without distortion. Then, the color correction is performed based on the image data IM on which the distortion correction is performed and the local dimming information DML. Therefore, it is possible to implement appropriate local dimming control based on the image data IM after the distortion correction.

In FIG. 2, the processing device 200 performs the global dimming control based on the detection information from the external light sensor 250. For example, the external light sensor 250 detects the brightness of the external light, and the global dimming control unit 210 of the processing device 200 performs the global dimming control based on a detection result of the brightness of the external light to calculate the global dimming information DMG.

In this way, the global dimming control, such as brightening or darkening the luminance of the backlight 120 according to the brightness of the external light, can be implemented. Then, while the processing device 200 performs the global dimming control using the detection information of the external light sensor 250, the circuit device 10 can perform the local dimming control based on the analysis result of the image data IMI. Since the circuit device 10 performs the local dimming control based on the analysis result of the image data IMI and the global dimming information DMG from the processing device 200, it is possible to implement the local dimming control reflecting the global dimming control performed in the processing device 200 using the external light sensor 250.

As shown in FIG. 2, the display device 100 includes the light source driver 130 that drives the light sources of the backlight 120. Then, the light source control circuit 60 of the circuit device 10 outputs, to the light source driver 130, backlight dimming information that is based on the local dimming information DML. For example, the light source control circuit 60 outputs the luminance information in each area of the backlight 120, which is the local dimming information DML, as the backlight dimming information, or outputs the PWM signal to be described later as the backlight dimming information.

In this way, the processing device 200 performs the global dimming control to output the global dimming information DMG and the image data IMI to the circuit device 10, and the circuit device 10 outputs, to the light source driver 130, the backlight dimming information that is based on the local dimming information DML calculated based on the image data IMI and the global dimming information DMG. Accordingly, the processing device 200 can perform the global dimming control, the circuit device 10 can perform the local dimming control, and the light source driver 130 can drive the local dimming reflecting the global dimming. Accordingly, it is possible to implement the local dimming in which the change in the existing system is minimized.

3. Dimming Control

Next, the dimming control circuit 50 will be described in detail. As shown in FIG. 2, the dimming control circuit 50 includes a luminance analysis unit 52, a luminance calculation unit 54, and a dimming amount calculation unit 56. The luminance analysis unit 52 performs the luminance analysis on the image data IM. The luminance calculation unit 54 performs luminance calculation processing based on a result of the luminance analysis executed by the luminance analysis unit 52 and the global dimming information DMG. The dimming amount calculation unit 56 performs processing of calculating the local dimming information based on a calculation result of the luminance in the luminance calculation unit 54. Specifically, based on the image data IM, the luminance analysis unit 52 searches each area of the plurality of areas of the display area for a pixel whose luminance is a maximum luminance in a corresponding area. The luminance calculation unit 54 performs correction of multiplying a maximum luminance of the found pixel by a luminance correction value of the global dimming information DMG. Then, the dimming amount calculation unit 56 determines a luminance distribution for each light source such that the color of the maximum luminance multiplied by the luminance correction value can be displayed, and performs calculation processing of recalculating the luminance for each pixel based on the determined luminance distribution of the light source and diffusion coefficient information of the light source to calculate the dimming amount corresponding to a luminance value of the backlight 120 for each pixel. The diffusion coefficient information is, for example, information on a diffusion coefficient parameter of a diffusion plate 115 in FIG. 10 to be described later. In addition, the information on the dimming amount from the dimming amount calculation unit 56 is sent to the light source driver 130 through the light source control circuit 60, and the light source driver 130 drives the light source of each area of the plurality of areas to emit light according to the dimming amount, thereby implementing the local dimming.

Figure 5:
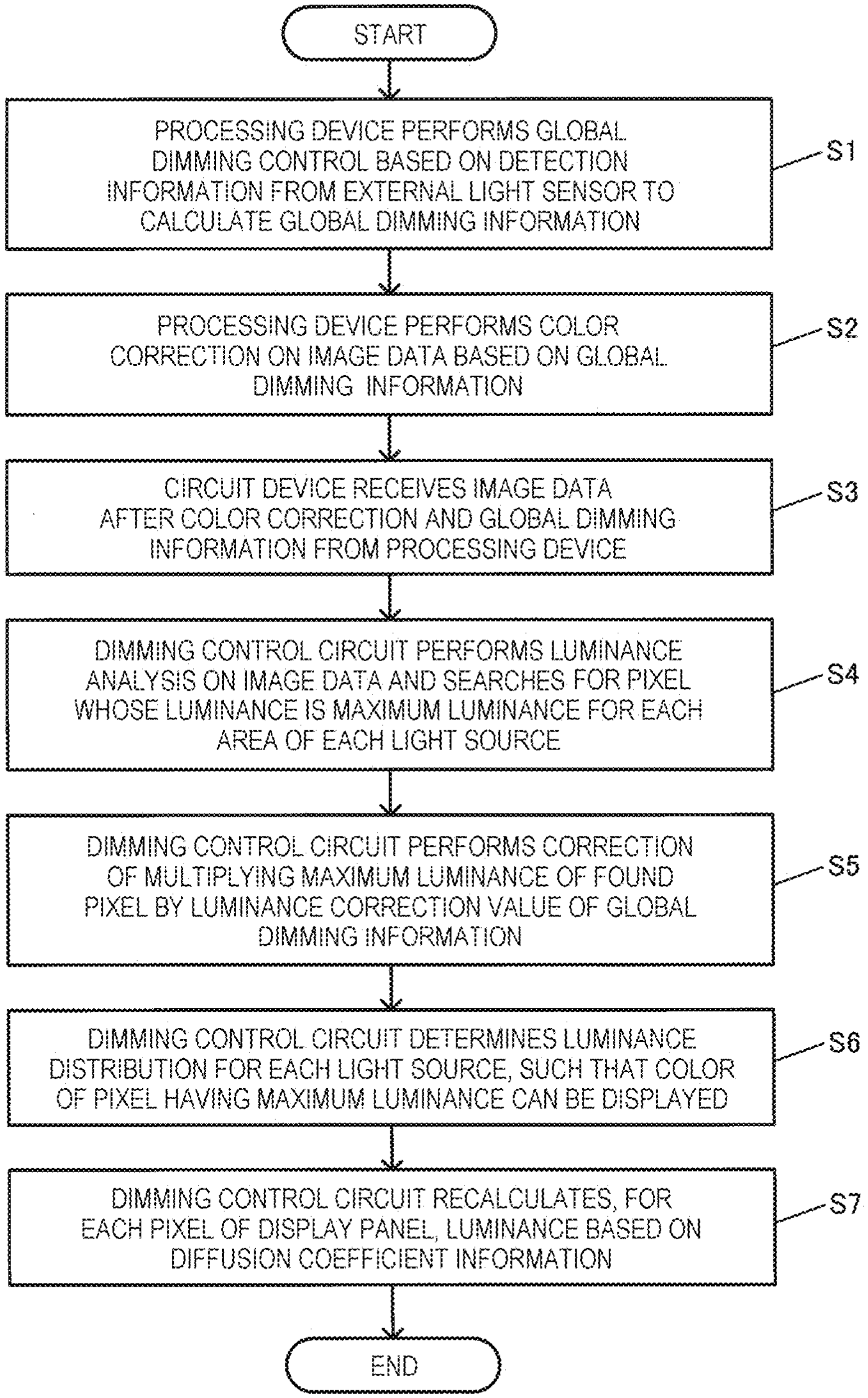
FIG. 5 is a flowchart showing a detailed example of processing according to the embodiment.

Next, a specific processing example according to the embodiment will be described. FIG. 5 is a flowchart showing detailed processing example according to the embodiment.

First, the processing device 200 performs global dimming control based on the detection information from the external light sensor 250 to calculate the global dimming information DMG (step S1). The processing device 200 performs color correction on the image data based on the global dimming information DMG (step S2). Then, the circuit device 10 receives the image data IMI after the color correction and the global dimming information DMG from the processing device 200 (step S3). By receiving the image data IMI and the global dimming information DMG, the circuit device 10 can execute the local dimming control reflecting the global dimming control of the processing device 200.

Next, the dimming control circuit 50 performs luminance analysis on the image data IMI and searches for a pixel whose luminance is a maximum luminance for each area of each light source (step S4). For example, in each area corresponding to each light source described with reference to FIGS. 3 and 4, based on the image data IM, luminance of pixels existing in the area is searched for, and the pixel whose luminance is the maximum luminance in the area is found. Then, the dimming control circuit 50 performs correction of multiplying the maximum luminance of the found pixel by a luminance correction value of the global dimming information DMG (step S5). Then, the dimming control circuit 50 determines the luminance distribution for each light source such that the color of the pixel having the maximum luminance can be displayed (step S6). Here, the maximum luminance is the maximum luminance after the correction obtained by multiplying the maximum luminance of the found pixel by the luminance correction value, and is simply described as the maximum luminance below. For example, it is assumed that a luminance range is from 0 to 100 and the luminance of the pixel having the maximum luminance is 50 in a target area. In this case, the luminance distribution of the light source is determined, such that the pixel having the luminance of 50, which is the maximum luminance, can be displayed, for example, in a color having a luminance of 100, which is an upper limit of the luminance range. When the luminance of the pixel having the maximum luminance is the upper limit luminance of the luminance range, luminance of other pixels is guaranteed to fall within the luminance range from 0 to 100. Then, the dimming control circuit 50 recalculates the luminance based on the diffusion coefficient information for each pixel of the display panel 110 (step S7). Accordingly, the luminance value of the backlight 120 for each pixel is obtained.

Figure 10:
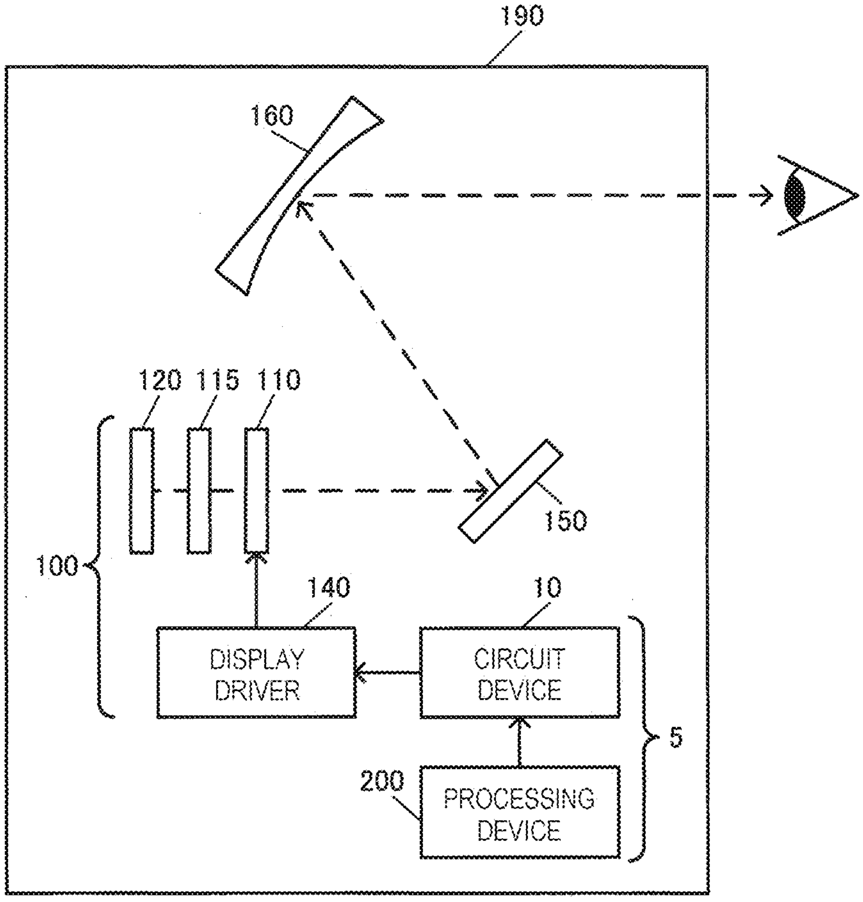
FIG. 10 shows a configuration example of a head-up display which is an example of a display system according to the embodiment.

For example, as shown in FIG. 10 to be described later, in the display device 100, the diffusion plate 115 for diffusing light from the light source to obtain a uniform luminance distribution is provided, for example, between the backlight 120 and the display panel 110. The diffusion plate 115 is also called a diffusion sheet. For example, as shown in FIG. 4, a light intensity distribution PSF of the light source is an intensity distribution in which a light intensity decreases as a distance from the light source increases. By providing the diffusion plate 115 and diffusing the light from the light source, luminance unevenness can be reduced, and a uniform surface light source can be implemented. Here, examples of a light diffusion type include a direct type, a side light type, and an edge light type. Then, in step S7 of FIG. 5, in addition to the light intensity distribution PSF of the light source in FIG. 4, the diffusion of the light from the light source using the diffusion plate 115 is also reflected, and the luminance for each pixel of the display panel 110 is recalculated to obtain the luminance value of the backlight 120 for each pixel. As an example, for a target pixel, light intensities of, for example, 4×4 LED light sources around the target pixel are obtained based on the light intensity distribution PSF in FIG. 4 and the diffusion coefficient information on the diffusion plate 115 to recalculate the luminance and obtain the luminance value of the backlight 120 for each pixel. In this manner, in the display device 100 including the backlight 120 provided with the plurality of light sources and the diffusion plate 115, it is possible to appropriately obtain the luminance value of the backlight 120 for each pixel.

Figure 6:
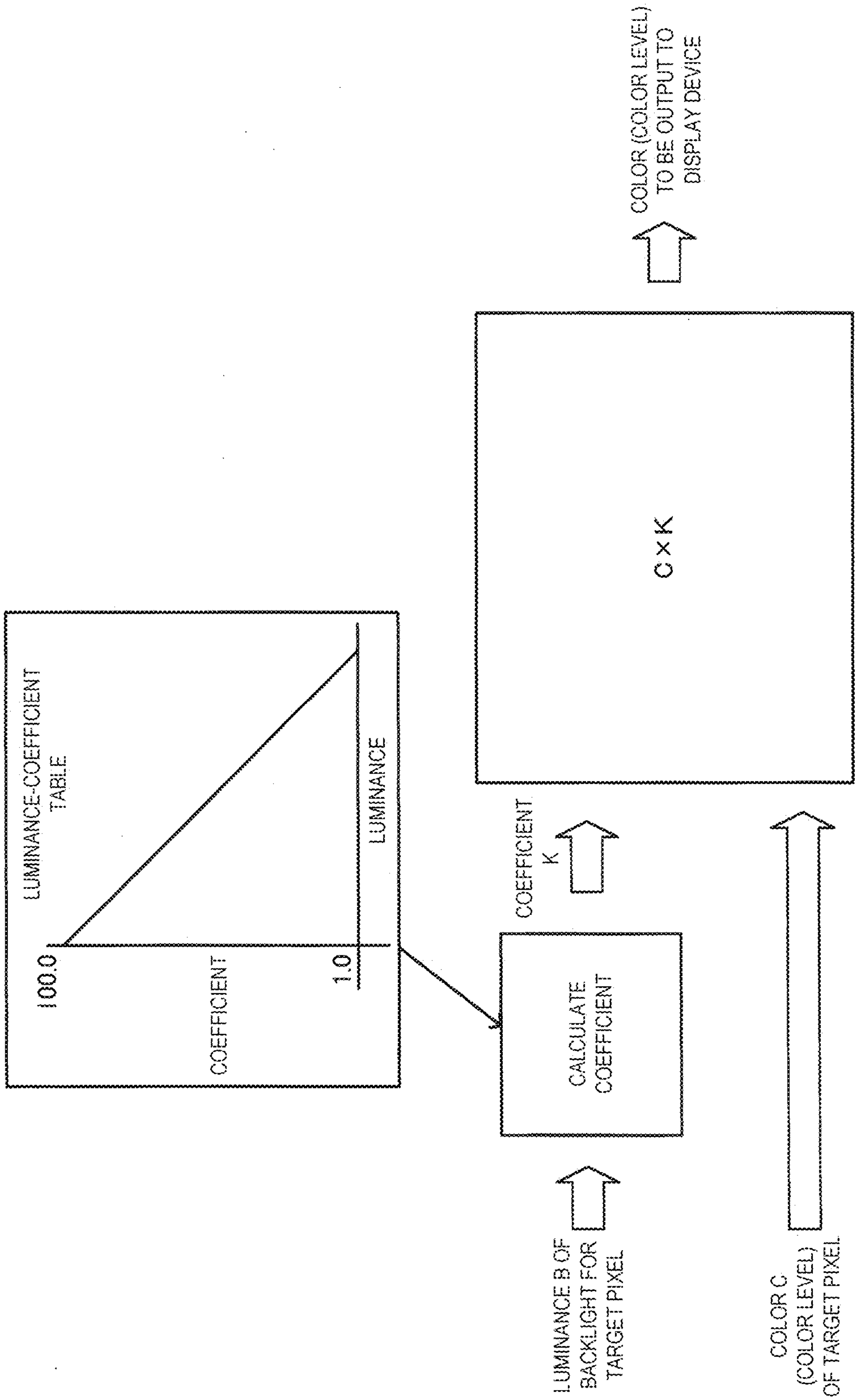
FIG. 6 is a diagram illustrating color correction.

FIG. 6 is a diagram illustrating a processing example of the color correction. First, as described with reference to FIG. 5, luminance B of the backlight 120 for a target pixel is obtained. A luminance-coefficient table is stored in a storage circuit (not shown) of the circuit device 10, and a coefficient K is calculated based on the luminance B of the backlight 120 using the table. The luminance-coefficient table in FIG. 6 is a table in which the coefficient K increases as the luminance B decreases. Instead of using such a luminance-coefficient table, the coefficient K may be obtained from the luminance B based on a predetermined calculation formula. Although the luminance-coefficient table in FIG. 6 has primary characteristics, the present disclosure is not limited thereto, and appropriate characteristics according to characteristics of human eyes with respect to the brightness of light may be used. In addition, the coefficient K may be obtained by interpolating two output values of the luminance-coefficient table by primary interpolation, spline interpolation, or the like. Then, the coefficient K thus obtained is multiplied by a level of a color C of the target pixel to obtain a color level to be output to the display device 100. That is, processing of increasing the color level of the image data is performed on a pixel having the low luminance B of the backlight 120. In this manner, the color correction circuit 30 can obtain the display image data IMD from the image data IM and output the display image data IMD to the display device 100. In the luminance-coefficient table in FIG. 6, the coefficient K increases as the luminance B of the backlight 120 decreases. Therefore, as the luminance of the backlight 120 for the target pixel decreases, the color level of the target pixel increases, which enables the dimming control.

Figure 7:
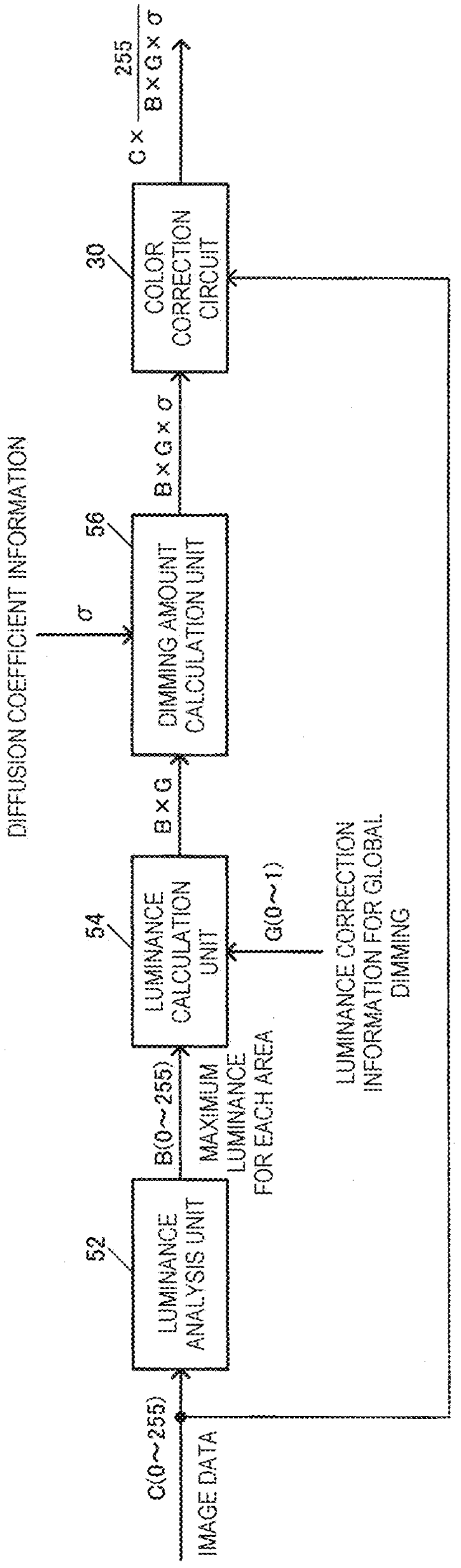
FIG. 7 is a diagram illustrating dimming control.

FIG. 7 is a diagram illustrating the dimming control according to the embodiment. The luminance analysis unit 52 receives the color C of the target pixel as the image data, performs the luminance analysis for each area, searches for a pixel whose luminance is the maximum luminance for each area, and outputs the maximum luminance B for each area. The luminance B is, for example, a value in a range from 0 to 255.

The luminance calculation unit 54 receives the luminance B and a luminance correction value G which is the luminance correction information for the global dimming. The luminance correction value G is a value in a range from 0 to 1 with "0" corresponding to 0% and "1" corresponding to 100%. The luminance calculation unit 54 multiplies the luminance B by the luminance correction value G and outputs B×G. By performing such multiplication processing, the local dimming control reflecting the global dimming control can be implemented. The dimming amount calculation unit 56 receives the B×G and a diffusion coefficient value σ as the diffusion coefficient information, and outputs B×G×σ. Then, the color correction circuit 30 receives the B×G×σ and the image data of the color C, and outputs C×(255/B×G×σ). Accordingly, the color correction described in FIG. 6 is implemented. When a calculation result of the C×(255/B×G×σ) exceeds 255, the result is treated as 255.

As described above, in FIG. 7, the pixel having the maximum luminance B is searched for each area of the image data, and the luminance B is multiplied by the luminance correction value of the global dimming. Processing of multiplying the diffusion coefficient value σ is performed. Then, the color correction of the color C of the image data is performed based on the obtained B×G×σ, and the C×(255/B×G×σ) is output. Accordingly, more appropriate color correction can be performed. In addition, since the maximum luminance B for each area is multiplied by the luminance correction value G of the global dimming, and the luminance of each light source of the backlight 120 is obtained, the local dimming control reflecting the global dimming control can be implemented.

4. Other Configuration Examples

Figure 8:
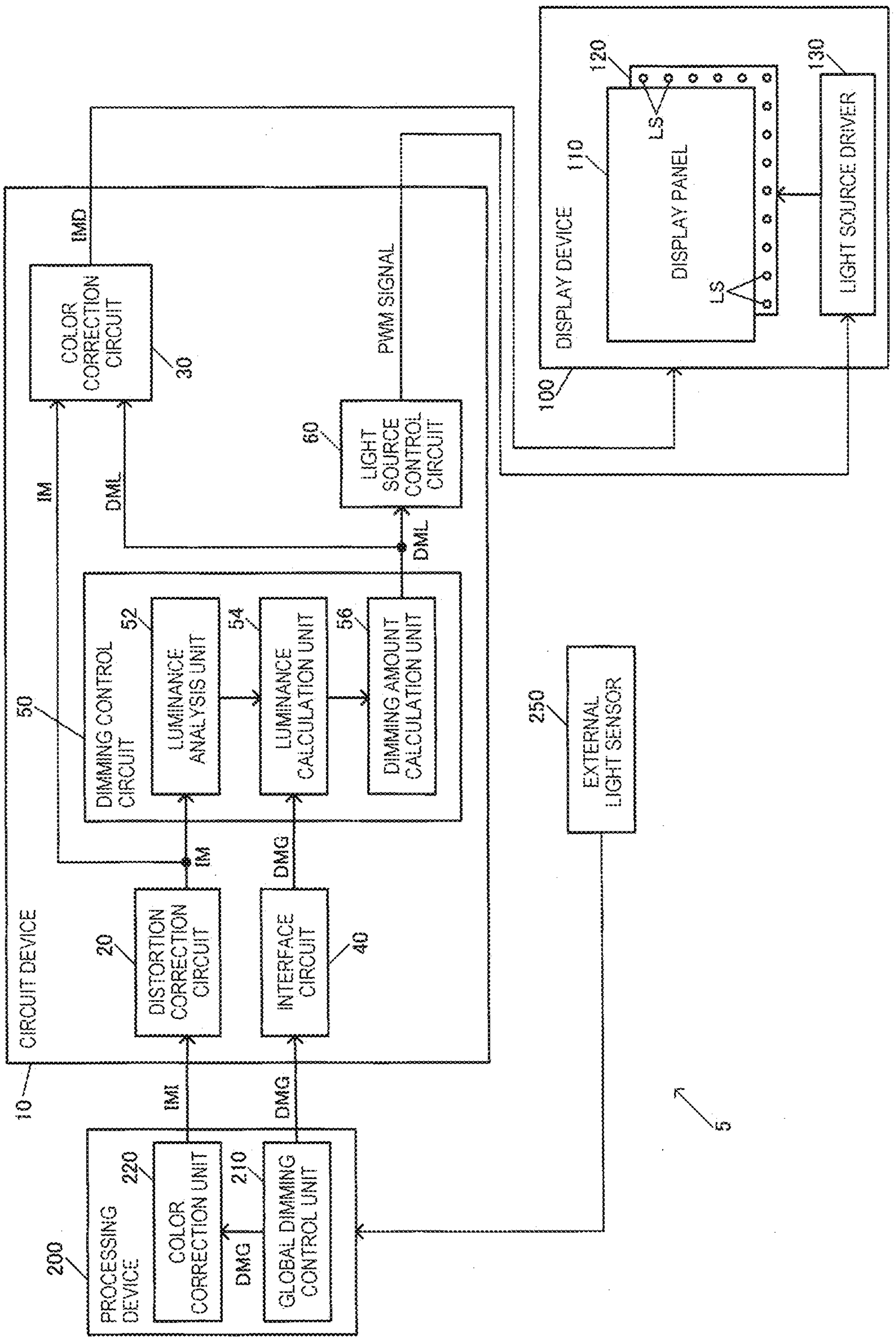
FIG. 8 shows another detailed configuration example of the circuit device according to the embodiment.
Figure 9:
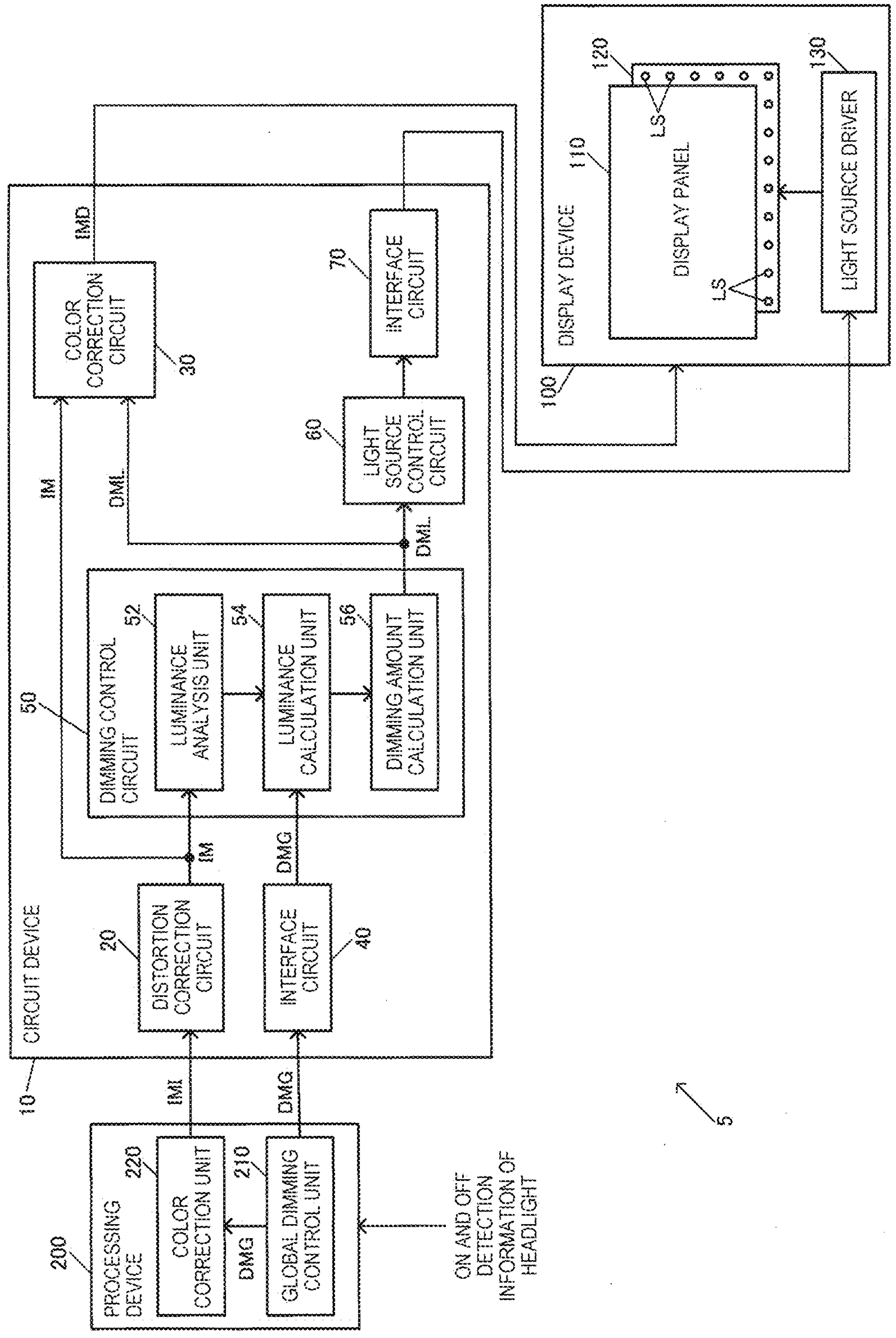
FIG. 9 shows another detailed configuration example of the circuit device according to the embodiment.

FIGS. 8 and 9 show other configuration examples of the display control system 5 and the circuit device 10 according to the embodiment. For example, in FIG. 2, the light source control circuit 60 outputs, to the light source driver 130, information for the light source driver 130 to generate the PWM signal as the backlight dimming information. On the other hand, in FIG. 8, a circuit for generating the PWM signal is provided in the light source control circuit 60, and the PWM signal is output to the display device 100 by the circuit. The PWM signal is a signal in which a pulse width is set based on luminance information which is dimming amount information of the light source of the backlight 120. For example, the light source driver 130 buffers the PWM signal from the light source control circuit 60 to drive a light source such as an LED of the backlight 120. The light source control circuit 60 may directly drive the light source of the backlight 120 without providing the light source driver 130.

In FIG. 2, the processing device 200 performs the global dimming control based on the detection information of the external light sensor 250. In FIG. 9, the global dimming control is performed based on ON and OFF detection information of a headlight. That is, the processing device 200 performs the global dimming control based on the ON and OFF detection information of the headlight of a moving object such as an automobile in which the display control system 5 is provided. For example, when the headlight is turned on or off according to the brightness of a surrounding environment, the processing device 200 performs the global dimming control based on the ON and OFF detection information. For example, when the headlight is turned on at night or when entering a tunnel, it can be determined that the surrounding environment is dark, and thus the processing device 200 performs, for example, the global dimming control for reducing the luminance of the backlight 120. On the other hand, when the headlight is turned off in the morning, during the daytime, or when exiting from the tunnel, or the like, it can be determined that the surrounding environment is bright, and thus the processing device 200 performs, for example, the global dimming control for increasing the luminance of the backlight 120. The headlight may be turned on or off automatically using a sensor, or a driver of an automobile may manually turn on or off the headlight.

5. Display System

FIG. 10 shows a configuration example of a head-up display 190 as an example of the display system according to the embodiment. The head-up display 190, which is the display system according to the embodiment, includes the display control system 5 and the display device 100 according to the embodiment. The display control system 5 may not include the processing device 200. The display device 100 displays the display image based on the display image data IMD from the circuit device 10. When the display system is the head-up display 190, the display device 100 displays a virtual image to the user by projecting the display image. For example, the display device 100 includes the display panel 110 and the backlight 120. The display device 100 may include a display driver 140 that drives the display panel 110, and the diffusion plate 115 provided between the display panel 110 and the backlight 120. The display device 100 may include a projection optical system such as a mirror 150 that reflects projection light of a projection image.

The display driver 140 drives the data lines and the scanning lines of the display panel 110 to display the image based on the display image data IMD from the circuit device 10. Light emitted from the backlight 120 passes through the diffusion plate 115 and the display panel 110, and is reflected by the mirror 150 toward a direction of a transparent screen 160. The transparent screen 160 is, for example, a windscreen of an automobile. A reflective surface of the transparent screen 160 is, for example, a concave surface, and the projection image is a virtual image when viewed from the user. That is, when viewed from the user, the projection image appears to be formed farther than the transparent screen 160. Accordingly, the projection image can be displayed in the background.

The display system according to the embodiment is not limited to the configuration shown in FIG. 10, and various modifications can be made. For example, a display panel other than the liquid crystal display panel may be used as the display panel 110, and various modifications of the arrangement of the diffusion plate 115 and the projection optical system can be made. In addition, the display system according to the present embodiment is not limited to the head-up display 190 as shown in FIG. 10, and may be another display system for an automobile such as a cluster display, or may be a display system for an application other than the automobile.

As described above, the display control system according to the embodiment includes a processing device configured to calculate global dimming information for global dimming control on a backlight of a display device including a display panel and the backlight, and perform color correction on image data based on the global dimming information; and a circuit device configured to perform display control on the display device based on the image data from the processing device. The circuit device includes a dimming control circuit that calculates, based on the image data and the global dimming information from the processing device, local dimming information for local dimming control on the backlight, and a light source control circuit that performs light source control on the backlight based on the local dimming information from the dimming control circuit.

In the embodiment, the processing device calculates the global dimming information and performs the color correction on the image data based on the global dimming information, the dimming control circuit of the circuit device calculates the local dimming information based on the image data and the global dimming information, and the light source control circuit performs the light source control on the backlight based on the local dimming information. In this way, the processing device can perform the global dimming control, and the circuit device can perform the local dimming control reflecting the global dimming control. Therefore, even if an existing system in which the processing device performs the global dimming control is not changed, the dimming control in which the local dimming control considering the global dimming control is implemented can be performed, and more appropriate dimming control on the display device can be implemented.

In the embodiment, the dimming control circuit may perform luminance analysis on the image data and calculate the local dimming information based on a result of the luminance analysis and the global dimming information.

In this way, the local dimming control reflecting the global dimming control in the processing device can be implemented by calculating the local dimming information corresponding to a result of the luminance analysis on the image data and performing the dimming on the backlight with a dimming amount corresponding to the local dimming information.

In the embodiment, the backlight may include a plurality of light sources, and each of the plurality of light sources may be provided corresponding to a respective one of a plurality of areas of the display panel. The dimming control circuit may perform the luminance analysis on the image data in each of the areas, and calculate, based on a result of the luminance analysis in the area and the global dimming information, a dimming amount of the light source corresponding to the area as the local dimming information.

In this way, the dimming amount of the light source corresponding to one of the plurality of areas of the display panel can be controlled based on the result of the luminance analysis on the image data in the area and the global dimming information, and local dimming control reflecting the global dimming control in the processing device can be implemented.

In the embodiment, the circuit device may further include a color correction circuit that performs the color correction on the image data based on the image data and the local dimming information.

In this way, it is possible to perform the color correction corresponding to the dimming control on the backlight based on the local dimming information from the dimming control circuit.

In the embodiment, the circuit device may further include a distortion correction circuit that performs distortion correction on the image data from the processing device, and the color correction circuit may perform the color correction based on the image data on which the distortion correction is performed and the local dimming information.

In this way, it is possible to perform, on the image, the distortion correction, which is image distortion inverse to image distortion caused by a projection target on which the display image of the display panel is projected. Then, the color correction is performed based on the image data on which the distortion correction is performed and the local dimming information. Therefore, it is possible to implement appropriate local dimming control based on the image data after the distortion correction.

In the embodiment, the processing device may perform the global dimming control based on detection information from an external light sensor.

In this way, the global dimming control, such as brightening or darkening the luminance of the backlight according to the brightness of the external light, can be implemented.

In the embodiment, the processing device may perform the global dimming control based on ON and OFF detection information of a headlight of a moving object provided with the display control system.

In this way, for example, when the headlight is turned on or off according to the brightness of a surrounding environment, the processing device can perform the global dimming control based on the ON and OFF detection information.

In the embodiment, the display device may include a light source driver that drives a light source of the backlight, and the light source control circuit of the circuit device may output, to the light source driver, backlight dimming information that is based on the local dimming information.

In this way, the processing device can perform the global dimming control to output the global dimming information and the image data to the circuit device, and the circuit device can output, to the light source driver, the backlight dimming information that is based on the local dimming information calculated from the image data and the global dimming information.

The circuit device according to the embodiment includes: an interface circuit configured to receive, from a processing device that calculates global dimming information for global dimming control on a display device including a display panel and a backlight and performs color correction on image data based on the global dimming information, the global dimming information. The circuit device further includes a dimming control circuit configured to calculate, based on the image data and the global dimming information from the processing device, local dimming information for local dimming control on the backlight; and a light source control circuit configured to perform light source control on the backlight based on the local dimming information from the dimming control circuit.

In this way, the processing device can perform the global dimming control, and the circuit device can perform the local dimming control reflecting the global dimming control. Therefore, even if an existing system in which the processing device performs the global dimming control is not changed, the dimming control in which the local dimming control considering the global dimming control is implemented can be performed, and more appropriate dimming control on the display device can be implemented.

The display system according to the embodiment includes: the display control system described above and the display device described above.

Although the embodiment has been described in detail as described above, it will be readily apparent to those skilled in the art that many modifications may be made without departing substantially from novel matters and effects of the present disclosure. Therefore, all such modifications are within the scope of the present disclosure. For example, a term cited with a different term having a broader meaning or the same meaning at least once in the description or the drawings can be replaced with the different term at any place in the description or the drawings. Further, all combinations of the embodiment and the modifications are also included in the scope of the present disclosure. Further, configurations, operations, and the like of the display control system, the circuit device, the display device, the display system, the head-up display, and the like are not limited to those described in the embodiment, and various modifications can be made.

What is claimed is:

1. A display control system comprising:

a processing device configured to:
- calculate global dimming information for global dimming control on a backlight of a display device including a display panel and the backlight; and
- perform color correction on initial data based on the global dimming information to output image data; and a circuit device configured to perform display control on the display device based on the image data from the processing device, wherein the circuit device includes:
- a distortion correction circuit configured to perform distortion correction on the image data to output corrected image data;
- a dimming control circuit configured to calculate, based on the corrected image data and the global dimming information, local dimming information for local dimming control on the backlight; and
- a light source control circuit configured to perform light source control on the backlight based on the local dimming information from the dimming control circuit.

2. The display control system according to claim 1, wherein the dimming control circuit is further configured to:
- perform luminance analysis on the corrected image data; and
- calculate the local dimming information based on a result of the luminance analysis and the global dimming information.

3. The display control system according to claim 2, wherein the backlight includes a plurality of light sources, each of the plurality of light sources is provided corresponding to a respective one of a plurality of areas of the display panel, and the dimming control circuit is configured to:
- perform the luminance analysis on the corrected image data in each of the plurality of areas; and calculate, based on a result of the luminance analysis in each of the plurality of areas and the global dimming information, a dimming amount of each of the plurality of light sources corresponding to each of the plurality of areas as the local dimming information.

4. The display control system according to claim 1, wherein the circuit device further includes a color correction circuit, and the color correction circuit is configured to perform another color correction on the corrected image data based on the local dimming information.

5. The display control system according to claim 1, wherein the processing device is configured to perform the global dimming control based on detection information from an external light sensor.

6. The display control system according to claim 1, wherein the processing device is configured to perform the global dimming control based on ON and OFF detection information of a headlight of a moving object provided with the display control system.

7. The display control system according to claim 1, wherein the display device includes a light source driver that drives a light source of the backlight, and the light source control circuit of the circuit device outputs, to the light source driver, backlight dimming information that is based on the local dimming information.

8. A circuit device comprising:

an interface circuit configured to receive, from a processing device that is configured to calculate global dimming information for global dimming control on a backlight of a display device including a display panel and the backlight and perform color correction on initial image data based on the global dimming information to output image data, the global dimming information;

a distortion correction circuit configured to perform distortion correction on the image data to output corrected image data;

a dimming control circuit configured to calculate, based on the corrected image data and the global dimming information, local dimming information for local dimming control on the backlight; and a light source control circuit configured to perform light source control on the backlight based on the local dimming information from the dimming control circuit.

9. A display system comprising:

the display control system according to claim 1; and the display device.

* * * * *